(12) United States Patent
Pogorelik

(10) Patent No.: US 10,909,374 B2
(45) Date of Patent: Feb. 2, 2021

(54) TECHNOLOGIES FOR IDENTIFYING UNRECOGNIZABLE OBJECTS IN AUTONOMOUS SYSTEMS

(71) Applicant: Intel Corporation, Santa Clara, CA (US)

(72) Inventor: Oleg Pogorelik, Lapid (IL)

(73) Assignee: Intel Corporation, Santa Clara, CA (US)

(*) Notice: Subject to any disclaimer, the term of this patent is extended or adjusted under 35 U.S.C. 154(b) by 102 days.

(21) Appl. No.: 16/124,919

(22) Filed: Sep. 7, 2018

(65) Prior Publication Data
US 2019/0050646 A1 Feb. 14, 2019

(51) Int. Cl.
| | | |
|---|---|---|
| *G06K 9/00* | (2006.01) |
| *G01S 17/89* | (2020.01) |
| *G06F 16/332* | (2019.01) |
| *G01S 17/04* | (2020.01) |
| *G01S 17/931* | (2020.01) |
| *G01S 17/86* | (2020.01) |

(52) U.S. Cl.
CPC .......... *G06K 9/00671* (2013.01); *G01S 17/04* (2020.01); *G01S 17/89* (2013.01); *G01S 17/931* (2020.01); *G06F 16/3329* (2019.01); *G06K 9/00684* (2013.01); *G06K 9/00805* (2013.01); *G01S 17/86* (2020.01)

(58) Field of Classification Search
CPC .......... G06K 9/00671; G06K 9/00805; G06K 9/00684; G06K 9/00791; G01S 17/04; G01S 17/931; G01S 17/89; G01S 17/86; G06F 16/3329

USPC ....... 382/159, 103, 190, 242, 203, 153, 154, 382/238; 700/250, 253, 255, 258, 259, 700/252, 254, 257, 245; 701/2, 300, 28, 701/11, 469; 901/1, 46, 47; 434/247; 370/331, 104; 707/999.001; 348/144; 345/156

See application file for complete search history.

(56) References Cited

U.S. PATENT DOCUMENTS

| | | | |
|---|---|---|---|
| 5,546,475 A | 8/1996 | Bolle et al. | |
| 7,152,050 B2 * | 12/2006 | Aoyama ................. | G10L 15/26 706/12 |

(Continued)

OTHER PUBLICATIONS

Extended European search report for European patent application No. 19190400.2, dated Jan. 21, 2020 (9 pages).

(Continued)

*Primary Examiner* — Sheela C Chawan
(74) *Attorney, Agent, or Firm* — Alliance IP, LLC

(57) ABSTRACT

Technologies for interacting with a user to identify an unrecognizable object include an autonomous device that is configured to obtain environmental data indicative of an environment, detect an object in the environment using the environmental data, determine, in response to detecting the object, whether the object is recognizable, activate, in response to determining that the object is not recognizable, a light source, indicate the object using the light source, query a user using the light source and a natural language query output with an audio device, receive a user response indicative of an object identity, and update a recognizable object database in response to a receipt of the user response to associate the object identity with the object.

25 Claims, 7 Drawing Sheets

(56) References Cited

U.S. PATENT DOCUMENTS

| | | | | |
|---|---|---|---|---|
| 10,272,828 | B2* | 4/2019 | White | G05D 1/0246 |
| 10,430,657 | B2* | 10/2019 | Assaf | B25J 9/1656 |
| 2009/0150156 | A1* | 6/2009 | Kennewick | G06Q 30/0261 |
| | | | | 704/257 |
| 2014/0124004 | A1* | 5/2014 | Rosenstein | G06T 7/62 |
| | | | | 134/18 |
| 2017/0312916 | A1* | 11/2017 | Williams | G01C 21/206 |
| 2017/0361468 | A1* | 12/2017 | Cheuvront | A47L 9/2805 |
| 2018/0285595 | A1* | 10/2018 | Jessen | G06F 21/6245 |
| 2019/0317594 | A1* | 10/2019 | Stent | B25J 9/1679 |

OTHER PUBLICATIONS

Jiatong Bao et al: "Detecting Target Objects by Natural Language Instructions Using an RGB-D Camera", Sensors, vol. 16, No. 12, Dec. 13, 2016 (Dec. 13, 2016), p. 2117.

Mario Prats et al: "An approach for semi-autonomous recovery of unknown objects in underwater environments", Optimization of Electrical and Electronic Equipment (OPTIM), 2012 13th International Conference on, IEEE, May 24, 2012 (May 24, 2012), pp. 1452-1457.

* cited by examiner

TECHNOLOGIES FOR IDENTIFYING UNRECOGNIZABLE OBJECTS IN AUTONOMOUS SYSTEMS

BACKGROUND

User interaction often requires a system to be familiar with an object of interest and allows users to use a semantic name associated with each object. When a system detects an unfamiliar object, an object recognition technique may be used to identify the unfamiliar object. However, object recognition is cost and performance expensive. As such, the system typically includes a limited number of objects that may be recognizable using the object recognition technique. Additionally, when the unfamiliar object is detected, the system may interrupt work flow and use a speech-based human interaction for resolving the issue. However, it may be difficult and lengthy to describe the unfamiliar object.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
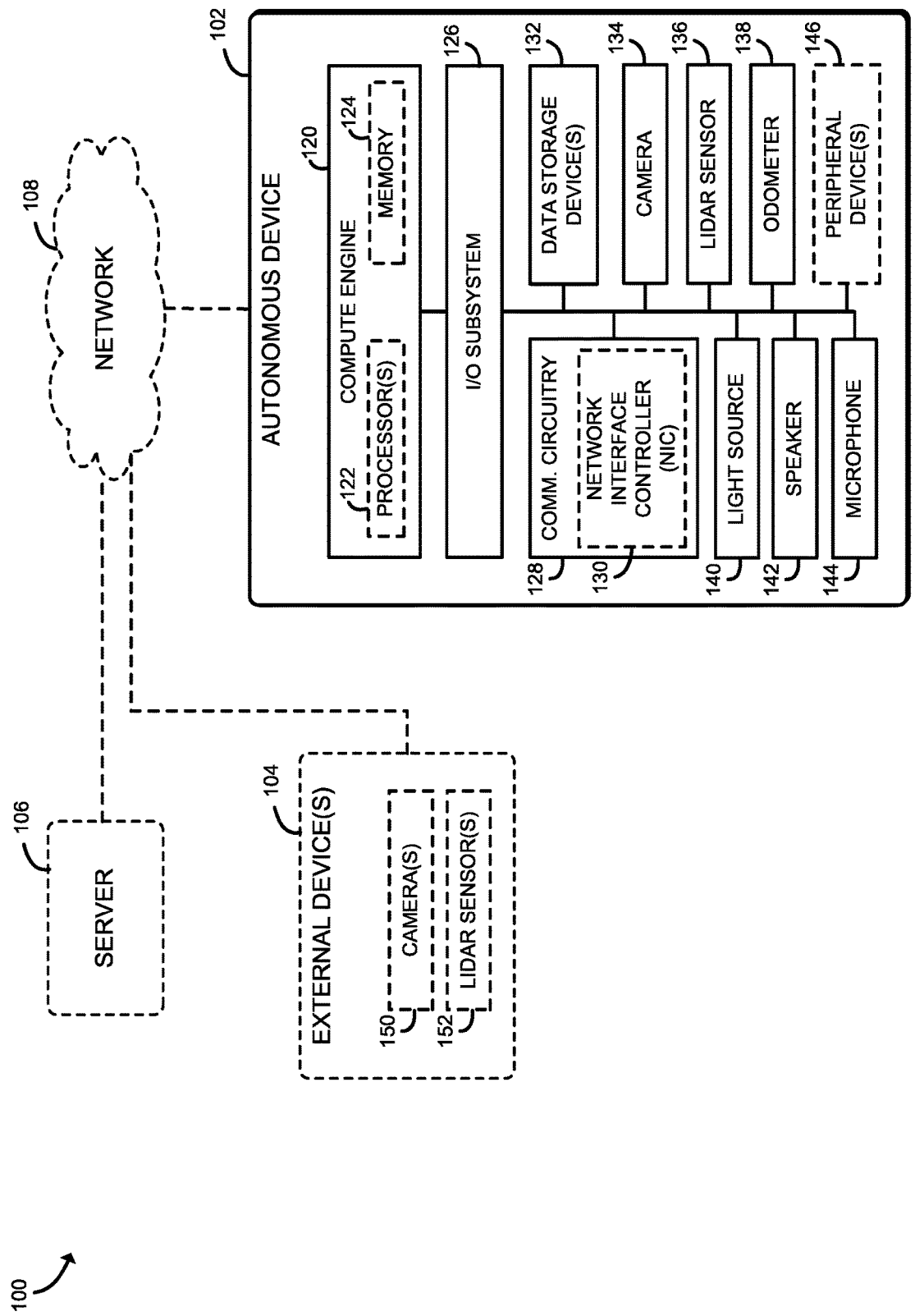
FIG. 1 is a simplified block diagram of at least one embodiment of an object detection system for identifying an unknown object includes an autonomous device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative object detection system 100 for interacting with a user to identify an unknown object includes an autonomous device 102. In the illustrative embodiment, the autonomous device 102 is a device that is capable of navigating an environment. It should be appreciated that, in some embodiments, components of the autonomous device 102 may be split among multiple devices. In other embodiments, one or more components of the autonomous device 102 may be embodied as part of external devices 104.

In use, the autonomous device 102 may detect and identify one or more objects located in an environment surrounding the autonomous device 102 and generate an environment map that includes locations of the detected objects. To do so, the autonomous device 102 may detect a presence of an object in the environment based on environmental data collected from one or more input devices (e.g., a camera 134 and/or a light detection and ranging (LIDAR) sensor 136) and perform data analysis (e.g., an object recognition technique and/or simultaneous localization and mapping (SLAM)) to identify the detected object. It should be appreciated that, in some embodiments, deep learning and machine learning techniques may also be used to identify one or more objects detected in the environment.

However, some object may not be recognizable using the object recognition technique. In such case, the autonomous device 102 may interact with a user to identify an unrecognizable object. Specifically, the autonomous device 102 may query the user to identify the unrecognizable or unknown object by visually indicating the object to the user using a light source 140 (e.g., a light pointer or a projector) and playing an indicator message describing details about the unrecognizable object. For example, the light source 140 may illuminate light incident on the object or project a frame of light surrounding the object. The indicator message may include the absolute coordinates of the unrecognizable object, relative coordinates relative to a nearby known object, a distance from the autonomous device 102, boundaries of the unrecognizable object, and/or additional features such as color or surface structure. It should be appreciated that the visual indication along with the indicator message allows the user to easily and quickly perceive which object is being referred to. Additionally, the use of the light source 140 instead of physical manipulation allows the autonomous device 102 to describe or identify objects that may not have been possible before. Once the autonomous device 102 receives a response from the user, the autonomous device 102 may update a recognizable object database and the environment map to include the newly identified object.

In some embodiments, the object detection system 100 may include a server 106 and one or more external devices 104. In such embodiments, the one or more external devices 104 may include one or more cameras 150 and one or more light detection and ranging (LIDAR) sensors 152 located in the environment. The additional environmental data may be obtained and utilized by the autonomous device 102 when generating or updating the environment map and detecting or identifying an object in the environment. Additionally, in some embodiments, the server 106 may obtain environmental data from the autonomous device 102 and one or more external devices 104 to perform data analysis (e.g., object recognition and/or simultaneous localization and mapping (SLAM)) to detect and/or identify an unknown object.

The network 108 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. In some embodiments, the network device may further include the server 106 and the external device(s) 104 and may facilitate communication between autonomous device 102, the server 106, and one or more external device(s) 104.

The autonomous device 102 may be embodied as any type of electronic device capable of performing the functions described herein, including, without limitation, a robot, a consumer robot, an autonomous home device, a smart security device, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. As discussed above, in the illustrative embodiment, the autonomous device 102 is capable of navigating the environment to collect environmental data of the environment, receiving data from one or more input devices of the autonomous device 102 (e.g., a camera 134, a LIDAR sensor 136, an odometer 138, and a microphone 144), generating an environment map of the environment, detecting an object in the environment, identifying a detected object, communicating with a user via a light source 140 and/or a speaker 142 to indicate an object (e.g., an unrecognizable object), and updating the recognizable object database in response to identifying a unrecognizable or unknown object. The environmental data may be used to determine a location of the autonomous device 102, detect a presence of an object, and identify a detected object. Additionally, the autonomous device 102 may track the location of the autonomous device 102 in the environment based on the environmental data and/or device data obtained from the odometer 138. In some embodiments, the autonomous device 102 may further include an accelerometer and/or a gyroscope.

As shown in FIG. 1, the illustrative autonomous device 102 includes a compute engine 120, an input/output (I/O) subsystem 126, communication circuitry 128, one or more data storage devices 132, the camera 134, the light detection and ranging (LIDAR) sensor 136, the odometer 138, the light source 140, the speaker 142, and the microphone 144. It should be appreciated that, in other embodiments, the autonomous device 102 may include other or additional components, such as those commonly found in a computer (e.g., peripheral devices 143). Additionally, in some embodiments, one or more of the illustrative components may be incorporated in, or otherwise form a portion of, another component.

The compute engine 120 may be embodied as any type of device or collection of devices capable of performing various compute functions described below. In some embodiments, the compute engine 120 may be embodied as a single device such as an integrated circuit, an embedded system, a field-programmable gate array (FPGA), a system-on-a-chip (SoC), or other integrated system or device. In the illustrative embodiment, the compute engine 120 includes or is embodied as one or more processors 122 and a memory 124. The processor 122 may be embodied as any type of processor capable of performing the functions described herein. For example, the processor 122 may be embodied as a single or multi-core processor(s), a microcontroller, or other processor or processing/controlling circuit. In some embodiments, the processor 122 may be embodied as, include, or be coupled to an FPGA, an application specific integrated circuit (ASIC), reconfigurable hardware or hardware circuitry, or other specialized hardware to facilitate performance of the functions described herein.

The memory 124 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

The compute engine 120 is communicatively coupled to other components of the autonomous device 102 via the I/O subsystem 126, which may be embodied as circuitry and/or components to facilitate input/output operations with the compute engine 120 (e.g., with the processor 122 and/or the memory 124) and other components of the autonomous device 102. For example, the I/O subsystem 126 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 126 may form a portion of a system-on-a-chip (SoC) and be incorporated, along with one or more of the processors 122, the memory 124, and other components of the autonomous device 102, into the compute engine 120.

The communication circuitry 128 may be embodied as any communication circuit, device, or collection thereof, capable of enabling communications between the autonomous device 102 and another device (e.g., the external devices 104 and/or the server 106). The communication circuitry 128 may be configured to use any one or more communication technology (e.g., wired or wireless communications) and associated protocols (e.g., Ethernet, Bluetooth®, Wi-Fi®, WiMAX, etc.) to effect such communication. The communication circuitry 128 may include a network interface controller (NIC) 130 (e.g., as an add-in device), which may also be referred to as a port logic. The NIC 130 may be embodied as one or more add-in-boards, daughter cards, network interface cards, controller chips, chipsets, or other devices that may be used by the autonomous device 102 to connect with another device (e.g., the external devices 104 and/or the server 106). In some embodiments, the NIC 130 may be embodied as part of a system-on-a-chip (SoC) that includes one or more processors, or included on a multichip package that also contains one or more processors. In some embodiments, the NIC 130 may include a local processor (not shown) and/or a local memory (not shown) that are both local to the NIC 130. In such embodiments, the local processor of the NIC 130 may be capable of performing one or more of the functions of the compute engine 120 described herein. Additionally or alternatively, in such embodiments, the local memory of the NIC 130 may be integrated into one or more components of the autonomous device 102 at the board level, socket level, chip level, and/or other levels.

The one or more illustrative data storage devices 132 may be embodied as any type of devices configured for short-term or long-term storage of data such as, for example, memory devices and circuits, memory cards, hard disk drives, solid-state drives, or other data storage devices. Each data storage device 132 may include a system partition that stores data and firmware code for the data storage device 132. Each data storage device 132 may also include one or more operating system partitions that store data files and executables for operating systems.

The server 106 may be embodied as any type of computation or computing device capable of performing the functions described herein, for example, a router, a switch, a network hub, an access point, a storage device, a compute device, a multiprocessor system, a network appliance (e.g., physical or virtual), a computer, a desktop computer, a smartphone, a workstation, a laptop computer, a notebook computer, a tablet computer, a mobile computing device, or any other computing device capable of processing network packets. As discussed above, in some embodiments, the server 106 may receive environmental data from the autonomous device 102 and perform data analysis (e.g., object recognition and/or simultaneous localization and mapping (SLAM)) to detect and/or identify an unknown object.

Figure 2:
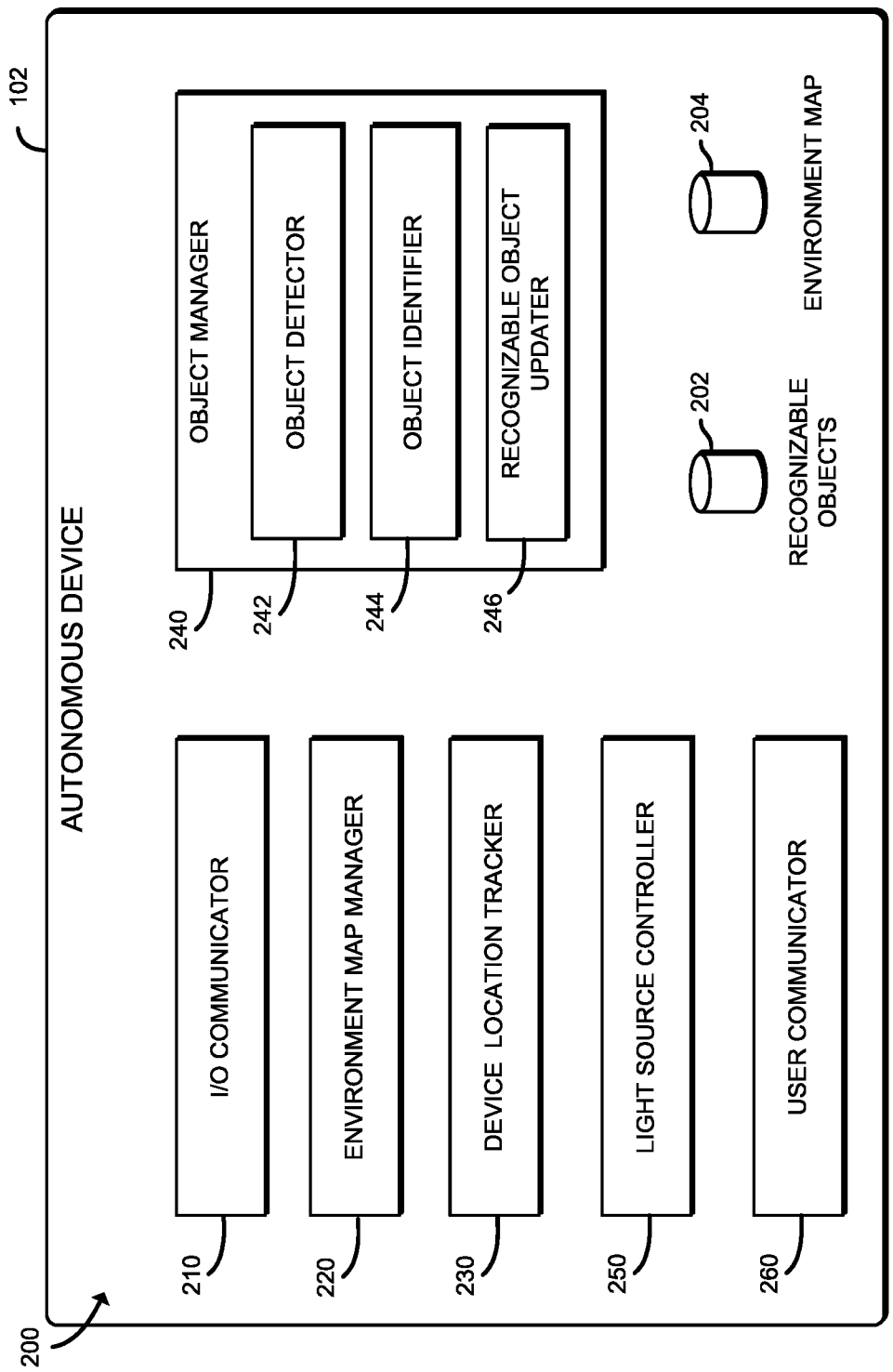
FIG. 2 is a simplified block diagram of at least one embodiment of an environment that may be established by the autonomous device of FIG. 1.

Referring now to FIG. 2, in the illustrative embodiment, the autonomous device 102 may establish an environment 200 during operation. The illustrative environment 200 includes an I/O communicator 210, an environment map manager 220, an device location tracker 230, an object manager 240, a light source controller 250, and a user communicator 260. The object manager 240 further includes an object detector 242, an object identifier 244, and a recognizable object updater 246. Each of the components of the environment 200 may be embodied as hardware, firmware, software, or a combination thereof. As such, in some embodiments, one or more of the components of the environment 200 may be embodied as circuitry or a collection of electrical devices (e.g., I/O communicator circuitry 210, environment map manager circuitry 220, device location tracker circuitry 230, object manager circuitry 240, object detector circuitry 242, object identifier circuitry 244, recognizable object updater circuitry 246, light source controller circuitry 250, user communicator circuitry 260, etc.). It should be appreciated that, in such embodiments, one or more of the I/O communicator circuitry 210, the environment map manager circuitry 220, the device location tracker circuitry 230, the object manager circuitry 240, the object detector circuitry 242, the object identifier circuitry 244, the recognizable object updater circuitry 246, the light source controller circuitry 250, and/or user the user communicator circuitry 260 may form a portion of a the compute engine 120 (e.g., one or more of the processor(s) 122, the memory 124), the I/O subsystem 126, and/or other components of the autonomous device 102.

The autonomous device 102 further includes a recognizable objects database 202 and an environment map 204. The recognizable objects database 202 includes one or more recognizable objects. For example, as discussed above, the autonomous device 102 is capable of recognizing a certain number of objects using the object recognition technique. In the illustrative embodiment, more recognizable objects may be added to the recognizable objects database 202 based on a user input indicative of an identification of an object that was unrecognizable using the object recognition technique. The environment map database 204 includes an environment map, which is a 2D or 3D digital blueprint of the environment that includes a floor plan, a furniture layout, and/or locations of one or more objects in the environment.

In the illustrative environment 200, the I/O communicator 210 is configured to communicate with other components of the autonomous device 102. For example, the I/O communicator 210 is configured to receive data from the camera 134, the LIDAR sensor 136, the odometer 138, the microphone 144, and/or other input peripheral devices. The I/O communicator 210 is further configured to transmit an output to a light source 140, a speaker 142, and/or other output peripheral devices. Accordingly, in some embodiments, at least a portion of the functionality of the I/O communicator 210 may be performed by communication circuitry 128 of the autonomous device 102.

The environment map manager 220 is configured to generate and/or update an environment map. To do so, the environment map manager 220 is configured to obtain environmental data from the camera 134 and the LIDAR sensor 136 and generate an environment map using visual simultaneous localization and mapping algorithms. As described above, the environment map is a 2D or 3D digital blueprint of the environment that includes a floor plan, a furniture layout, and/or locations of one or more objects in the environment. The environment map manager 220 is further configured to update the environment map in response to identifying a new object in the environment.

The device location tracker 230 is configured to track a location of the autonomous device 102 in the environment map. To do so, the device location tracker 230 obtains the environmental data from the camera 134 and the LIDAR sensor 136 and/or device data obtained from the odometer

138. The device data indicates a distance traveled by the autonomous device 102. Based on the environmental data and the device data, the device location tracker 230 is configured to determine a location of the autonomous device 102 and keep track of the autonomous device 102 in the environment map.

The object manager 240 is configured to manage one or more objects detected in the environment. To do so, the object manager 240 includes the object detector 242, the object identifier 244, and the recognizable object updater 246. The object detector 242 is configured to detect an object in the environment. For example, the object detector 242 may use the environmental data obtained from the camera 134 and/or the LIDAR sensor 136 to determine whether a new object is detected in the environment. In another example, the object detector 242 is configured to detect a target object in the environment in response to a receipt of instructions from a user indicating the target object and a target action to be performed to the target object or near the location of the target object. For example, the user may point to a chair and state "please clean near that chair." In response, the object detector 242 may use the environmental data to determine a gesture of the user (e.g., pointing) and/or the recognizable object database 202 to determine "that chair" and a location of "that chair." In this example, the object detector 242 may further determine a direction where the user is pointing to relative to the location of the autonomous device 102 base on the environmental data. In response to determining where the user is pointing to, the object detector 242 may determine the location of the target object using the environment map and detect the target object.

The object identifier 244 is configured to identify an object that is detected by the object detector 242. Particularly, the object identifier 244 is configured to determine whether the detected object can be identified. For example, the object identifier 244 may determine whether the detected object is in the recognizable object database 202 and/or attempt to identify the detected object using an object recognition technique. Additionally or alternatively, the object identifier 244 may identify the detected object based on a location of the detected object in the environment map. In response to an identification of an unrecognizable object in the environment, the recognizable object updater 246 is configured to update the recognizable object database 202 to add the newly identified object.

It should be appreciated that if the object identifier 244 is not able to identify the detected object, the light source controller 250 and the user communicator 260 may communicate with a user to identify the unrecognizable or unknown object, as described further below. In response to a receipt of an identity of the unrecognizable object, the recognizable object updater 246 is configured to update the recognizable object database 202 to associate the identity received from the user with the newly identified object in response to a confirmation that the user wants to store the newly identified object in the recognizable object database 202 for future use. For example, in the illustrative embodiment, the recognizable object updater 246 determines that the autonomous device 102 is in a learning mode, the recognizable object updater 246 communicates with the user communicator 260 to query the user to confirm that the newly identified object is to be stored in the recognizable object database 202. In other words, the user may selectively decide which object is to be stored in the recognizable object database 202 for future use to prevent cluttering the recognizable object database 202. However, it should be appreciated that, in some embodiments, the newly identified object may be automatically stored in the recognizable object database 202 in response to a receipt of an user input.

The light source controller 250 is configured to control the light source 140. Particularly, the light source controller 250 activates the light source 140 in response to a determination that the detected object is unknown or unrecognizable by the object identifier 244. The light source controller 250 is configured to activate the light source 140 to indicate the detected object to attract a user's attention. For example, the light source controller 250 may illuminate the light incident on the detected object or project a frame of light surrounding the detected object to indicate the detected object. When the light source controller 250 determines that the user's attention is no longer needed, the light source controller 250 is configured to deactivate the light source 140. In the illustrative embodiment, the light source controller 250 may deactivate the light source 140 if a predefined time is reached after the activation of the light source 140 without a receipt of a user input.

The user communicator 260 is configured to communicate with a user via the speaker 142. In response to determining that the detected object is unknown or unrecognizable, the user communicator 260 is configured to query a user via the speaker 142 while the light source controller 250 indicates the unrecognized object using the light source 140. To do so, in some embodiments, the user communicator 260 may query the user based on absolute coordinates of the unrecognized object. Alternatively, the user communicator 260 may query the user based on relative coordinates relative to a nearby known object. For example, the autonomous device 102 may query the user, "What do you call this object that is located 10 cm from the chair?" while the light source controller 250 points to the unrecognized object with the light source 140. Alternatively, the user communicator 260 may query the user based on a distance from a nearby known object or the autonomous device 102. For example, the autonomous device 102 may query the user, "What do you call that object located 50 cm from me?" while the light source controller 250 points to the unrecognized object with the light source 140.

Alternatively, the user communicator 260 may query the user based on boundaries of the unrecognized object. For example, the autonomous device 102 may query the user, "What do you call this object on the dining table?" while the light source controller 250 points to the unrecognized object with the light source 140. Alternatively, the user communicator 260 may query the user based on features of the unrecognized object (e.g., color, surface structure, or any other characteristics that can be perceived by the autonomous device 102). For example, the autonomous device 102 may query the user, "What do you call this yellow object?" while the light source controller 250 points to the unrecognized object with the light source 140. The user communicator 260 is further configured to receive a user's response to the query identifying the queried object.

Moreover, in some embodiments, the user communicator 260 is configured to receive instructions from the user. The instructions may include a target object and a target action to be performed to the target object or near the location of the target object. In such embodiments, the user communicator 260 is configured to communicate with the user to identify the target object.

Figure 3:
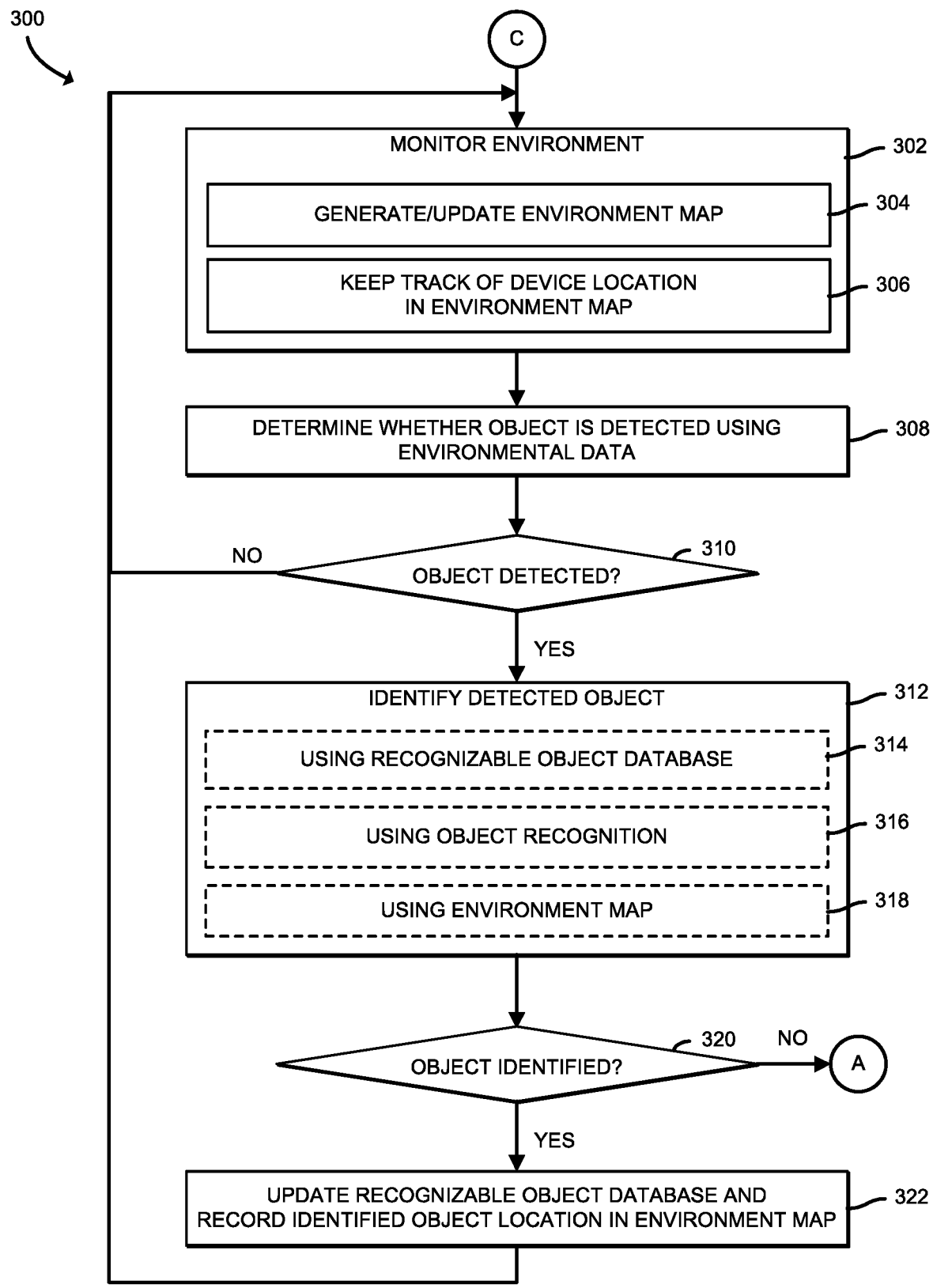
FIGS. 3-5 are a simplified flow diagram of at least one embodiment of a method for identifying an unknown object in an environment that may be executed by the autonomous device of FIGS. 1 and 2.
Figure 4:
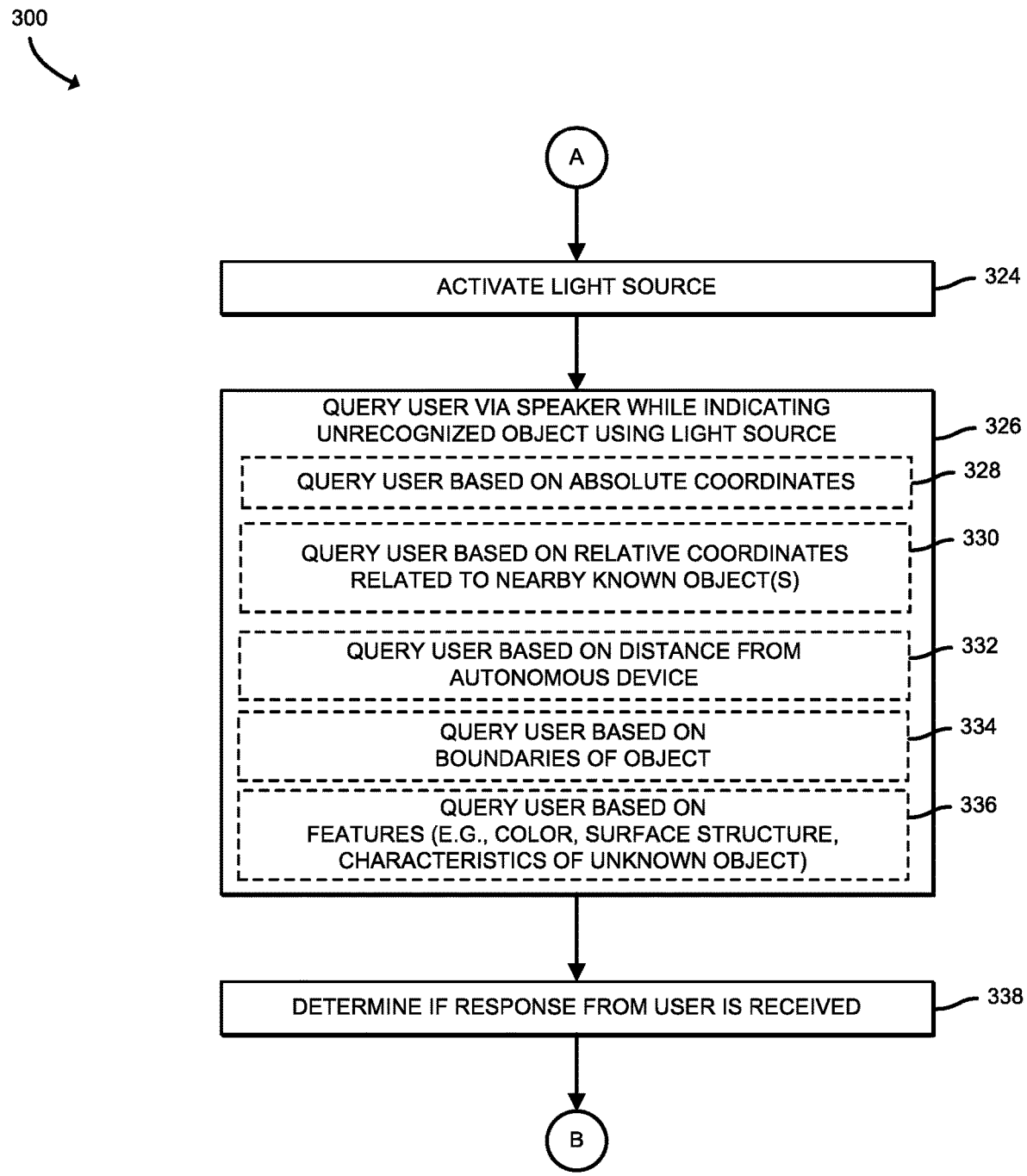
Figure 5:
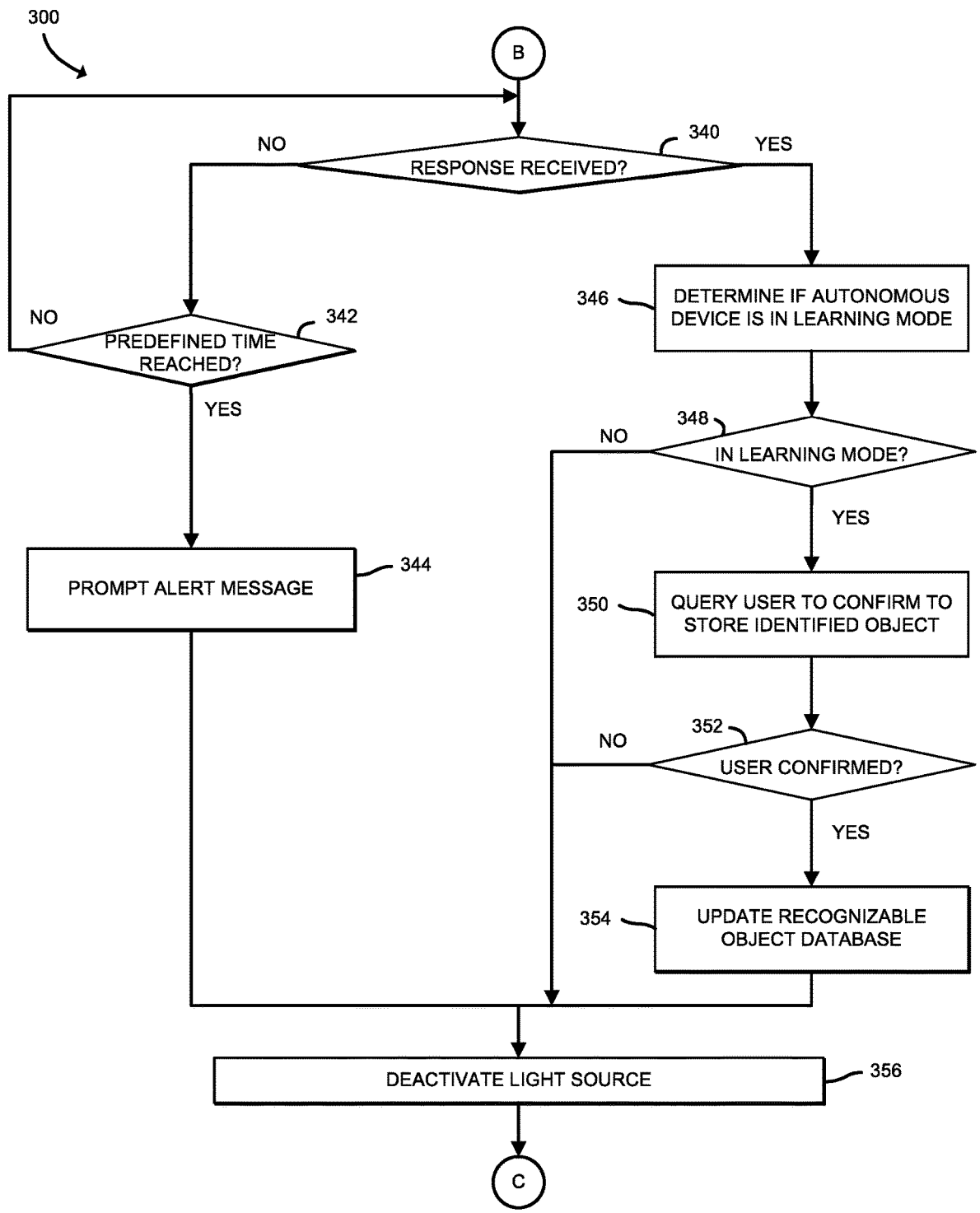

Referring now to FIGS. 3-5, in use, the autonomous device 102 may execute a method 300 for communicating with a user to identify an unrecognizable object using a light source 140. The method 300 begins with block 302 in which the autonomous device 102 monitors an environment surrounding the autonomous device 102. While monitoring the environment, the autonomous device 102 generates or updates a new or existing environment map 204, respectively, as illustrated in block 304. As discussed above, the environment map is a 2D or 3D digital blueprint of the environment that includes a floor plan, a furniture layout, and/or locations of one or more objects. For example, in the illustrative embodiment, the autonomous device 102 generates the environment map based on environmental data obtained from the camera 134 and/or the LIDAR sensor 136 using visual simultaneous localization and mapping algorithms. In some embodiments, the autonomous device 102 may obtain additional environmental data from one or more external devices 104 (e.g., the external cameras 150 and/or the external LIDAR sensors 152 located in the environment).

Additionally, the autonomous device 102 keeps track of a location of the autonomous device 102 in the environment map, as illustrated in block 306. For example, based on the environmental data obtained from the camera 134 and the LIDAR sensor 136 and/or device data obtained from the odometer 138, the autonomous device 102 determines a location of the autonomous device 102 in the environment map.

In block 308, the autonomous device 102 determines whether an object is detected in the environment using the environmental data. If the autonomous device 102 determines that an object is not detected in block 310, the method 300 loops back to block 302 to continue monitoring the environment. If, however, the autonomous device 102 determines that an object is detected in block 310, the method 300 advances to block 312.

In block 312, the autonomous device 102 determines whether the detected object can be identified. For example, the autonomous device 102 may determine whether the detected object is in the recognizable object database 202, as illustrated in block 314. Additionally or alternatively, the autonomous device 102 may attempt to identify the detected object using an object recognition technique, as illustrated in block 316. Additionally or alternatively, the autonomous device 102 may identify the detected object based on a location of the detected object in the environment map, as illustrated in block 318.

In block 320, the autonomous device 102 determines whether the detected object has been identified. If the detected object has been identified, the method 300 advances to block 322, in which the autonomous device 102 updates the recognizable object database 202 and records the location of the newly identified object in the environment map. The method 300 then loops back to block 302 to continue monitoring the environment. If, however, the detected object has not been identified in block 320, the method 300 branches to block 324 of FIG. 4.

In block 324 shown in FIG. 4, the autonomous device 102 activates the light source 140 in response to determining that the detected object is unknown or unrecognized. Subsequently, in block 326, the autonomous device 102 queries a user via the speaker 142 while indicating the unrecognized object using the light source 140. To do so, as illustrated in block 328, the autonomous device 102 may query the user based on absolute coordinates of the unrecognized object. Alternatively, as illustrated in block 330, the autonomous device 102 may query the user based on relative coordinates relative to a nearby known object. For example, the autonomous device 102 may query the user, "What do you call this object that is located 10 cm from a chair?" while pointing to the unrecognized object with the light source 140.

Alternatively, as illustrated in block 332, the autonomous device 102 may query the user based on a distance from a nearby known object or the autonomous device 102. For example, the autonomous device 102 may query the user, "What do you call that object located 50 cm from me?" while pointing to the unrecognized object with the light source 140. Alternatively, as illustrated in block 334, the autonomous device 102 may query the user based on boundaries of the unrecognized object. For example, the autonomous device 102 may query the user, "What do you call this object on the dining table?" while pointing to the unrecognized object with the light source 140.

Alternatively, as illustrated in block 336, the autonomous device 102 may query the user based on features of the unrecognized object (e.g., color, surface structure, or any other characteristics that can be perceived by the autonomous device 102). For example, the autonomous device 102 may query the user, "What do you call this yellow object?" while pointing to the unrecognized object with the light source 140.

Subsequently, in block 338, the autonomous device 102 determines whether a response is received from the user via the microphone 144 of the autonomous device 102. If the autonomous device 102 determines that the response is not received in block 340, the method 300 advances to block 342. In block 342, the autonomous device 102 determines whether a predefined time has been reached. If not, the method 300 loops back to block 340 to continue to determine whether a response has been received from the user. If, however, the predefined time has been reached in block 342, the method 300 advances to block 344 to prompt an alert message to the user indicating that the unrecognized object could not be identified. The method 300 then skips ahead to block 356 to deactivate the light source 140.

Referring back to block 340, if the autonomous device 102 determines that the response indicative of an identity of the object has been received from the user, the method 300 advances to block 346. In block 346, the autonomous device 102 determines if the autonomous device 102 is in a learning mode. If the autonomous device 102 determines that it is in the learning mode in block 348, the method 300 advances to block 350. In block 350, the autonomous device 102 queries the user to confirm that the object identified by the user is to be stored in the recognizable object database 202 of the autonomous device 102. For example, the autonomous device 102 may query the user, "Would you like me to remember this object for future use?" If the user confirms in block 352, the autonomous device 102 advances to block 354 to update the recognizable object database 202 to associate the identity received from the user with the newly identified object. If, however, the user indicates not to remember the object or does not respond within a predefined time, the method 300 skips ahead to block 356. In block 356, the autonomous device 102 deactivates the light source 140, and the method 300 loops back to block 302 shown in FIG. 3 to continue monitoring the environment.

Figure 6:
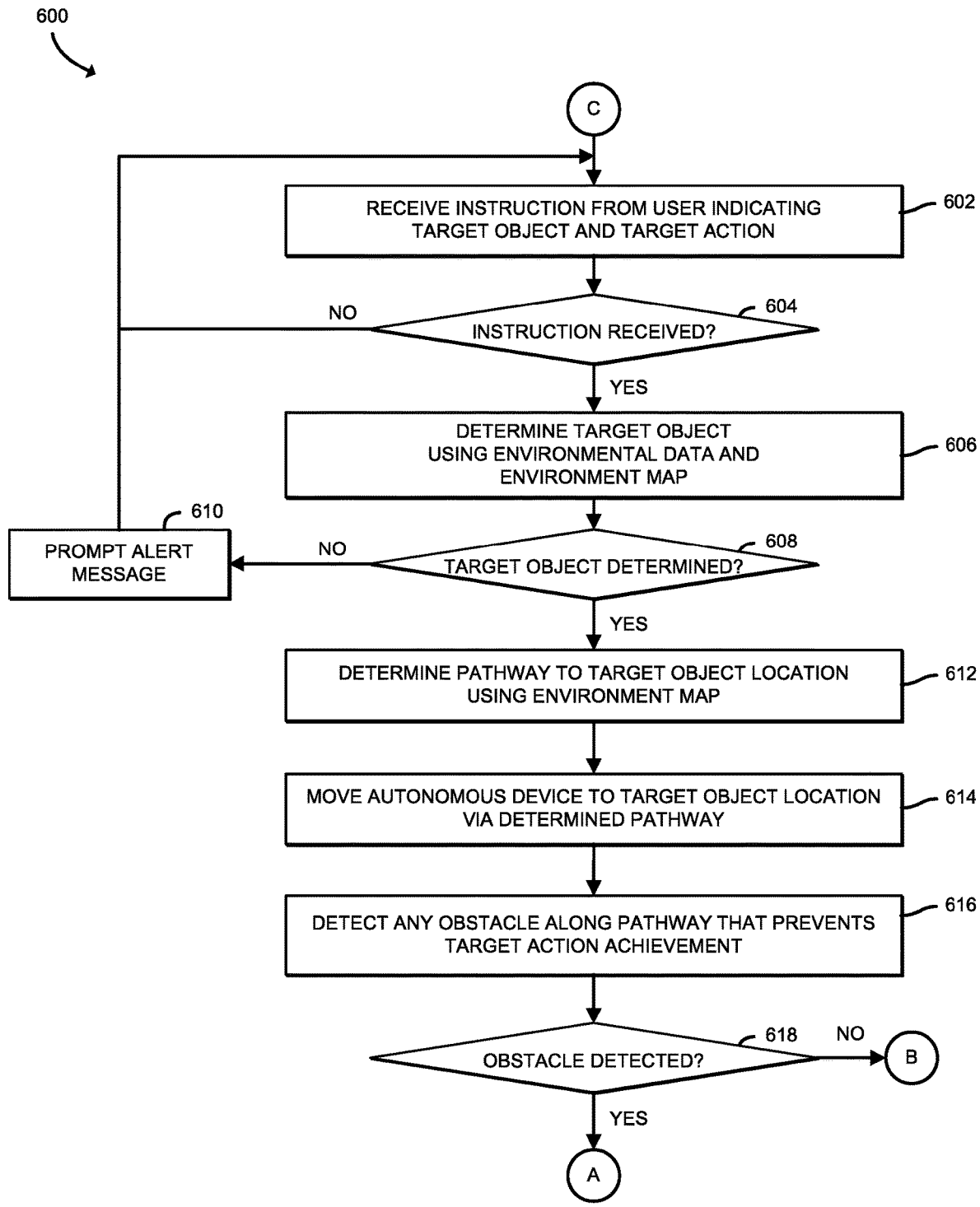
FIGS. 6 and 7 are a simplified flow diagram of at least one embodiment of a method for communicating an obstacle to a user that may be executed by the autonomous device of FIGS. 1 and 2.
Figure 7:
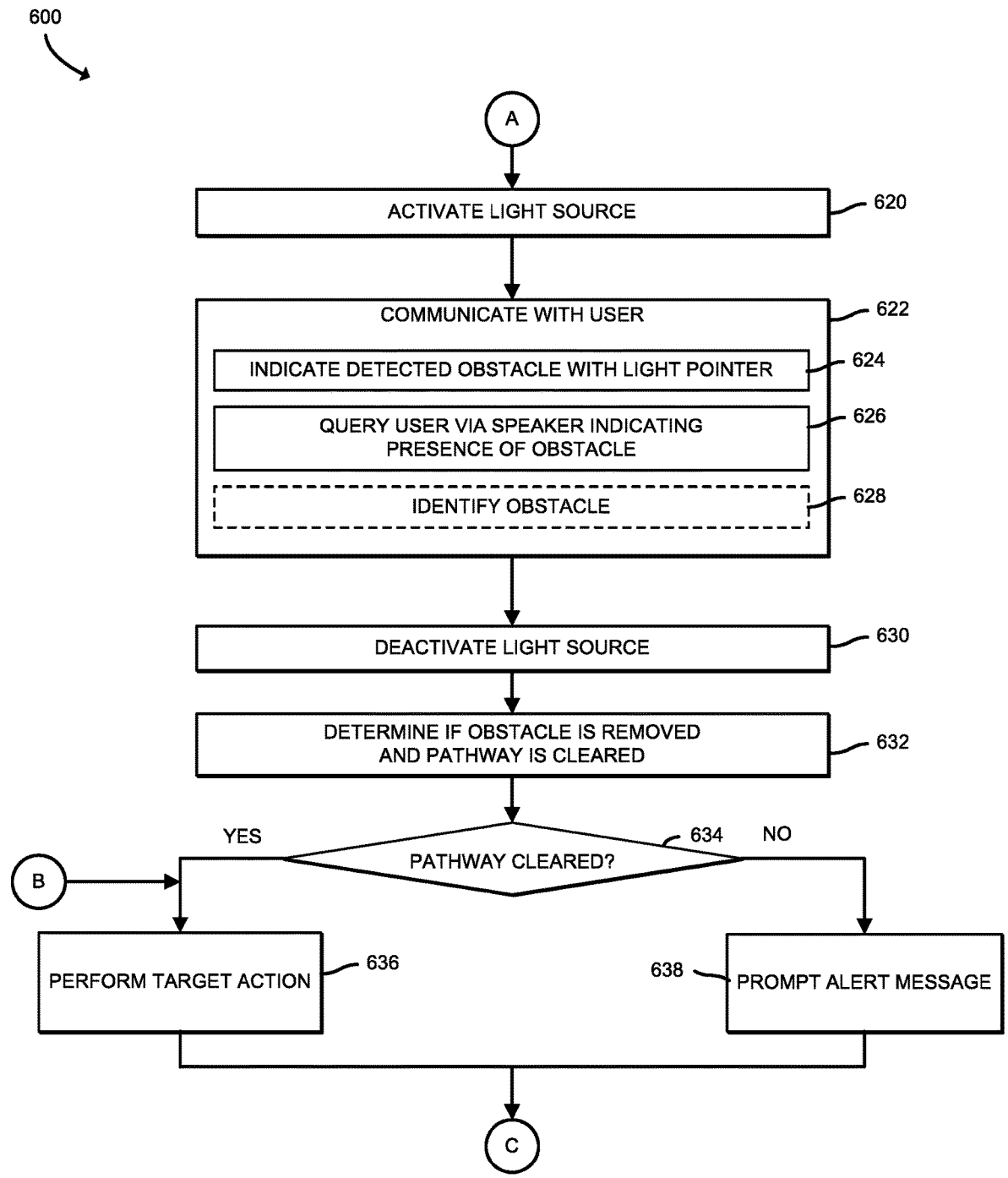

Referring now to FIGS. 6 and 7, in use, the autonomous device 102 may execute a method 600 for communicating with a user to identify an unrecognizable object using a light source 140. The method 600 begins with block 602 in which the autonomous device 102 receives an instruction from a user indicating a target object and a target action to be performed on or near the target object. If the autonomous device 102 determines that the instruction has not been received in block 604, the method 600 loops back to block 602 to continue monitoring for an instruction.

If, however, the autonomous device 102 determines that the instruction has been received in block 604, the method 600 advances to block 606. In block 606, the autonomous device 102 determines a target object using environmental data obtained from the camera 134 and/or the LIDAR sensor 136 and an environment map 204. As discussed above, the environment map 204 includes locations of recognized objects in the environment. For example, the user may point to a chair and state, "Please clean near that chair." The autonomous device 102 may use the environmental data to determine a gesture of the user (e.g., pointing) and/or the recognizable object database 202 to determine where and what "that chair" is referring to. In this example, the autonomous device 102 determines a direction where the user is pointing to relative to the location of the autonomous device 102 base on the environmental data. In response to determining where the user is pointing to, the autonomous device 102 determines the location of the target object using the environment map.

If the autonomous device 102 determines that the target object is not determined in block 608, the method 600 advances to block 610, in which the autonomous device 102 prompts an alert message to the user indicating that the target action could not be performed. The method 600 then loops back to block 602 to continue receiving a new instruction from a user.

If, however, the autonomous device 102 determines that the target object is determined in block 608, the method 600 advances to block 612. In block 612, the autonomous device 102 determines a pathway to the target object location from the autonomous device 102 using the environment map. Subsequently, the autonomous device 102 moves the autonomous device 102 to the target object location via the determined pathway, as illustrated in block 614.

In block 616, the autonomous device 102 detects any obstacle along the pathway that prevents the autonomous device 102 to perform the target action. If the obstacle is not detected in block 618, the method 600 skips ahead to block 636, in which the autonomous device 102 performs the target action. Subsequently, the method 600 loops back to block 602 to continue monitoring for an instruction from a user.

Referring back to block 618, if the obstacle is detected, the method 600 advances to block 620 of FIG. 7. In block 620, the autonomous device 102 activates the light source 140. Subsequently, in block 622, the autonomous device 102 communicates with the user. For example, in the illustrative embodiment, the autonomous device 102 communicates with the user indicating the detected obstacle with the light source 140, as illustrated in block 624. Additionally, the autonomous device 102 queries the user via the speaker 142 indicating the presence of the obstacle, as illustrated in block 626. For example, the autonomous device 102 may state, "Sony, there is this obstacle that doesn't allow me to reach the target location" and point to the obstacle with the light source 140.

In some embodiments, as illustrated in block 628, the autonomous device 102 may further identify the obstacle based on a location of the detected object in the environment map, using the recognizable object database 202 and/or using an object recognition technique. In such embodiments and in response to identifying the obstacle as a carpet, the autonomous device 102 may state, "Sony, there is this carpet that doesn't allow me to reach the target location" and point to the carpet.

It should be appreciated that, in some embodiments, the autonomous device 102 may further query the user if the autonomous device 102 determines that the obstacle is unrecognizable. As discussed in detail in FIGS. 3 and 4, the autonomous device 102 may perform steps similar to block 312-356 to query the user to identify the unrecognizable obstacle.

Subsequently, the autonomous device 102 deactivates the light source 140 in block 630 and determines whether the obstacle is removed and the pathway is cleared in block 632. If the autonomous device 102 determines that the obstacle has been removed and the pathway has been cleared in block 634, the method 600 advances to block 636 to perform the target action. The method 600 then loops back to block 602 to continue monitoring for an instruction from a user.

If, however, the autonomous device 102 determines that the obstacle has not been removed and the pathway has not been cleared, the method 600 advances to block 638, in which the autonomous device 102 prompts an alert message to the user indicating that the target action could not be performed. The method 600 then loops back to block 602 to continue monitoring for an instruction from a user.

EXAMPLES

Illustrative examples of the technologies disclosed herein are provided below. An embodiment of the technologies may include any one or more, and any combination of, the examples described below.

Example 1 includes an autonomous device for user interaction to identify an unrecognizable object, the autonomous device comprising an I/O communicator to obtain environmental data indicative of an environment; an object manager to detect an object in the environment using the environmental data and determine, in response to a detection the object, whether the object is recognizable; a light source controller to activate, in response to a determination that the object is not recognizable, a light source and indicate the object using the light source; and a user communicator to query a user using the light source and a natural language query output with an audio device and receive a user response indicative of an object identity; wherein the object manager is further to update a recognizable object database in response to a receipt of the user response to associate the object identity with the object.

Example 2 includes the subject matter of Example 1, and further including an environment map manager to generate an environment map, wherein the environment map includes a digital blueprint of the environment including locations of one or more recognized objects in the environment.

Example 3 includes the subject matter of any of Examples 1 and 2, and further including a device location tracker to monitor a location of the autonomous device in the environment map.

Example 4 includes the subject matter of any of Examples 1-3, and wherein the environmental data includes data obtained from a camera or a LIDAR sensor.

Example 5 includes the subject matter of any of Examples 1-4, and wherein to detect the object comprises to detect the object using a recognizable object database or an environment map.

Example 6 includes the subject matter of any of Examples 1-5, and wherein to indicate the object using the light source comprises to indicate the object by illuminating light indicate on the object.

Example 7 includes the subject matter of any of Examples 1-6, and wherein to indicate the object using the light source comprises to indicate the object by projecting a frame of light surrounding the object.

Example 8 includes the subject matter of any of Examples 1-7, and wherein to query the user comprises to query the user based on at least one of absolute coordinates of the object, relative coordinates relative to one or more nearby known objects, or a distance from the autonomous device.

Example 9 includes the subject matter of any of Examples 1-8, and wherein to query the user comprises to query the user based on one or more features of the object.

Example 10 includes the subject matter of any of Examples 1-9, and wherein the light source controller is further to deactivate the light source in response to a determination that a predefined time is reached without a receipt of the user response after the activation of the light source.

Example 11 includes one or more machine-readable storage media comprising a plurality of instructions stored thereon that, in response to being executed, cause an autonomous device to obtain environmental data indicative of an environment; detect an object in the environment using the environmental data; determine whether the object is recognizable; activate, in response to determining that the object is not recognizable, a light source; indicate the object using the light source; query a user using the light source and a natural language query output with an audio device; receive a user response indicative of an object identify; and update a recognizable object database in response to a receipt of the user response to associate the object identity with the object.

Example 12 includes the subject matter of Example 11, and further including a plurality of instructions that in response to being executed cause the autonomous device to generate an environment map, wherein the environment map includes a digital blueprint of the environment including locations of one or more recognized objects in the environment.

Example 13 includes the subject matter of any of Examples 11 and 12, and further including a plurality of instructions that in response to being executed cause the autonomous device to monitor a location of the autonomous device in the environment map, wherein to detect the object comprises to detect the object using a recognizable object database or an environment map.

Example 14 includes the subject matter of any of Examples 11-13, and wherein the environmental data includes data obtained from a camera or a LIDAR sensor.

Example 15 includes the subject matter of any of Examples 11-14, and wherein to indicate the object using the light source comprises to indicate the object by illuminating light indicate on the object.

Example 16 includes the subject matter of any of Examples 11-15, and wherein to indicate the object using the light source comprises to indicate the object by projecting a frame of light surrounding the object.

Example 17 includes the subject matter of any of Examples 11-16, and wherein to query the user comprises to query the user based on at least one of absolute coordinates of the object, relative coordinates relative to one or more nearby known objects, or a distance from the autonomous device.

Example 18 includes the subject matter of any of Examples 11-17, and wherein to query the user comprises to query the user based on one or more features of the object.

Example 19 includes the subject matter of any of Examples 11-18, and further including a plurality of instructions that in response to being executed cause the autonomous device to deactivate the light source in response to a determination that a predefined time is reached without a receipt of the user response after the activation of the light source.

Example 20 includes a method for interacting with a user to identify an unrecognizable object, the method comprising obtaining, by an autonomous device, environmental data indicative of an environment; detecting, by the autonomous device, an object in the environment using the environmental data; determining, in response to detecting the object and by the autonomous device, whether the object is recognizable; activating, in response to determining that the object is not recognizable and by the autonomous device, a light source; indicating, by the autonomous device, the object using the light source; querying, by the autonomous device, a user using the light source and a natural language query output with an audio device; receiving, by the autonomous device, a user response indicative of an object identity; and updating, by the autonomous device, a recognizable object database in response to a receipt of the user response to associate the object identity with the object.

Example 21 includes the subject matter of Example 20, and further including tracking a location of the autonomous device in the environment map, wherein detecting the object comprises detecting the object using a recognizable object database or an environment map.

Example 22 includes the subject matter of any of Examples 20 and 21, and wherein indicating the object using the light source comprises indicating the object by illuminating light indicate on the object.

Example 23 includes the subject matter of any of Examples 20-22, and wherein indicating the object using the light source comprises indicating the object by projecting a frame of light surrounding the object. 24 The method of claim 20, wherein querying the user comprises querying the user based on at least one of absolute coordinates of the object, relative coordinates relative to one or more nearby known objects, a distance from the autonomous device, or one or more features of the object.

Example 25 includes the subject matter of any of Examples 20-24, and further including determining, by an autonomous device, whether a predefined time is reached without a receipt of the user response after the activation of the light source; transmitting, in response to determining that the predefined time has been reached and by an autonomous device, an alert message; and deactivating, by an autonomous device, the light source.

The invention claimed is:

1. An autonomous device for user interaction to identify an unrecognizable object, the autonomous device comprising:
    an I/O communicator to obtain environmental data indicative of an environment;
    an object manager to detect an object in the environment using the environmental data and determine, in response to a detection the object, whether the object is recognizable;
    a light source controller to activate, in response to a determination that the object is not recognizable, a light source and indicate the object using the light source; and
    a user communicator to query a user using the light source and a natural language query output with an audio device and receive a user response indicative of an object identity;

wherein the object manager is further to update a recognizable object database in response to a receipt of the user response to associate the object identity with the object.

2. The autonomous device of claim 1 further comprising an environment map manager to generate an environment map, wherein the environment map includes a digital blueprint of the environment including locations of one or more recognized objects in the environment.

3. The autonomous device of claim 1 further comprising a device location tracker to monitor a location of the autonomous device in the environment map.

4. The autonomous device of claim 1, wherein the environmental data includes data obtained from a camera or a LIDAR sensor.

5. The autonomous device of claim 1, wherein to detect the object comprises to detect the object using a recognizable object database or an environment map.

6. The autonomous device of claim 1, wherein to indicate the object using the light source comprises to indicate the object by illuminating light indicate on the object.

7. The autonomous device of claim 1, wherein to indicate the object using the light source comprises to indicate the object by projecting a frame of light surrounding the object.

8. The autonomous device of claim 1, wherein to query the user comprises to query the user based on at least one of absolute coordinates of the object, relative coordinates relative to one or more nearby known objects, or a distance from the autonomous device.

9. The autonomous device of claim 1, wherein to query the user comprises to query the user based on one or more features of the object.

10. The autonomous device of claim 1, wherein the light source controller is further to deactivate the light source in response to a determination that a predefined time is reached without a receipt of the user response after the activation of the light source.

11. One or more non-transitory, machine-readable storage media comprising a plurality of instructions stored thereon that, in response to being executed, cause an autonomous device to:
obtain environmental data indicative of an environment;
detect an object in the environment using the environmental data;
determine whether the object is recognizable;
activate, in response to determining that the object is not recognizable, a light source;
indicate the object using the light source;
query a user using the light source and a natural language query output with an audio device;
receive a user response indicative of an object identify; and
update a recognizable object database in response to a receipt of the user response to associate the object identity with the object.

12. The one or more non-transitory, machine-readable storage media of claim 11, further comprising a plurality of instructions that in response to being executed cause the autonomous device to generate an environment map, wherein the environment map includes a digital blueprint of the environment including locations of one or more recognized objects in the environment.

13. The one or more non-transitory, machine-readable storage media of claim 11, further comprising a plurality of instructions that in response to being executed cause the autonomous device to monitor a location of the autonomous device in the environment map, wherein to detect the object comprises to detect the object using a recognizable object database or an environment map.

14. The one or more non-transitory, machine-readable storage media of claim 11, wherein the environmental data includes data obtained from a camera or a LIDAR sensor.

15. The one or more non-transitory, machine-readable storage media of claim 11, to indicate the object using the light source comprises to indicate the object by illuminating light indicate on the object.

16. The one or more non-transitory, machine-readable storage media of claim 11, wherein to indicate the object using the light source comprises to indicate the object by projecting a frame of light surrounding the object.

17. The one or more non-transitory, machine-readable storage media of claim 11, wherein to query the user comprises to query the user based on at least one of absolute coordinates of the object, relative coordinates relative to one or more nearby known objects, or a distance from the autonomous device.

18. The one or more non-transitory, machine-readable storage media of claim 11, wherein to query the user comprises to query the user based on one or more features of the object.

19. The one or more non-transitory, machine-readable storage media of claim 11, further comprising a plurality of instructions that in response to being executed cause the autonomous device to deactivate the light source in response to a determination that a predefined time is reached without a receipt of the user response after the activation of the light source.

20. A method for interacting with a user to identify an unrecognizable object, the method comprising:
obtaining, by an autonomous device, environmental data indicative of an environment;
detecting, by the autonomous device, an object in the environment using the environmental data;
determining, in response to detecting the object and by the autonomous device, whether the object is recognizable;
activating, in response to determining that the object is not recognizable and by the autonomous device, a light source;
indicating, by the autonomous device, the object using the light source;
querying, by the autonomous device, a user using the light source and a natural language query output with an audio device;
receiving, by the autonomous device, a user response indicative of an object identity; and
updating, by the autonomous device, a recognizable object database in response to a receipt of the user response to associate the object identity with the object.

21. The method of claim 20 further comprising tracking a location of the autonomous device in the environment map, wherein detecting the object comprises detecting the object using a recognizable object database or an environment map.

22. The method of claim 20, wherein indicating the object using the light source comprises indicating the object by illuminating light indicate on the object.

23. The method of claim 20, wherein indicating the object using the light source comprises indicating the object by projecting a frame of light surrounding the object.

24. The method of claim 20, wherein querying the user comprises querying the user based on at least one of absolute coordinates of the object, relative coordinates relative to one or more nearby known objects, a distance from the autonomous device, or one or more features of the object.

25. The method of claim 20 further comprising:
determining, by an autonomous device, whether a predefined time is reached without a receipt of the user response after the activation of the light source;
transmitting, in response to determining that the predefined time has been reached and by an autonomous device, an alert message; and
deactivating, by an autonomous device, the light source.

\* \* \* \* \*